Jan. 28, 1958 H. SOHN 2,821,349
DIVE CONTROL SYSTEM FOR PILOTLESS AIRCRAFT
Filed Nov. 4, 1952 2 Sheets-Sheet 1
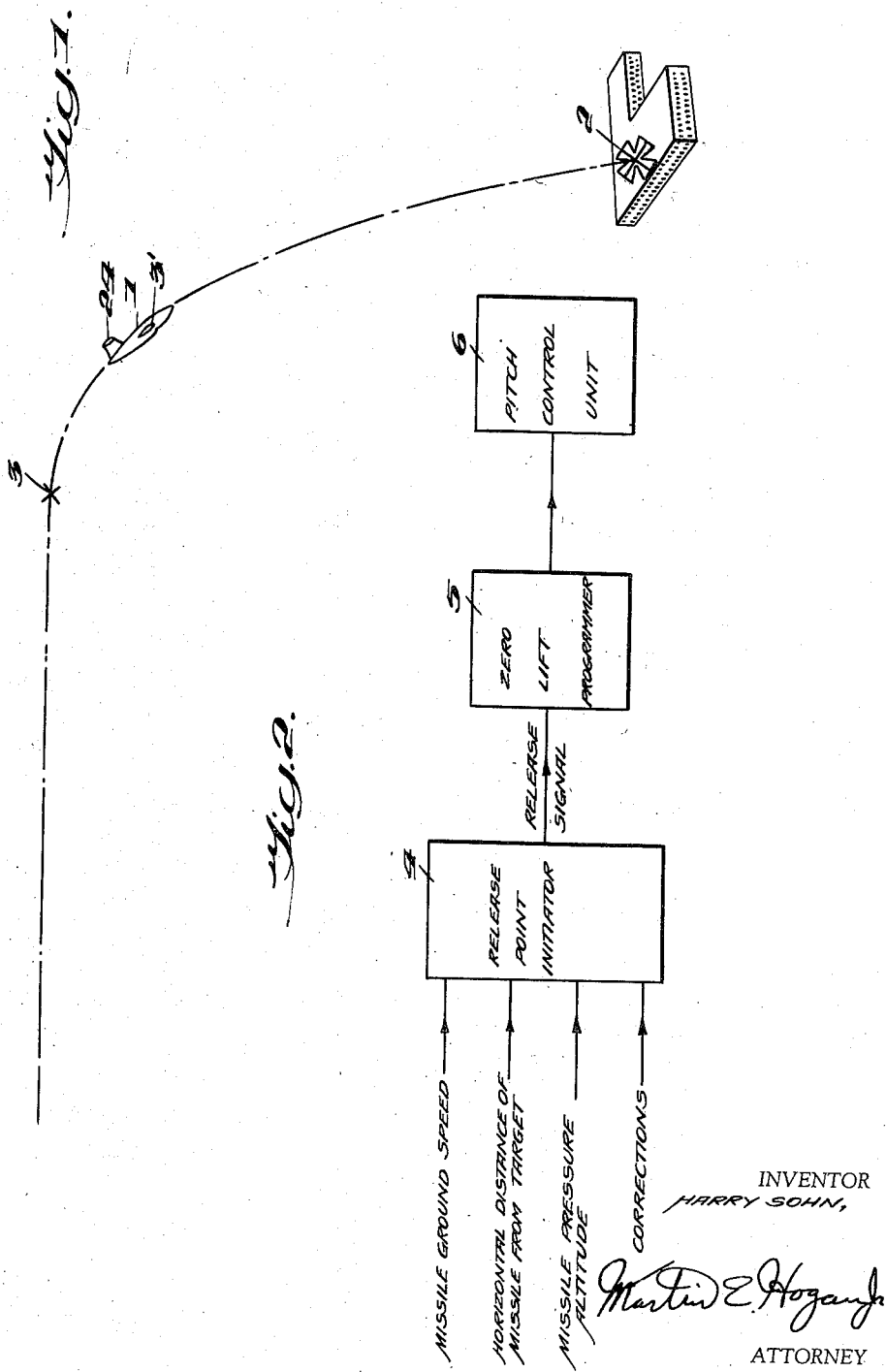
INVENTOR
HARRY SOHN,
ATTORNEY

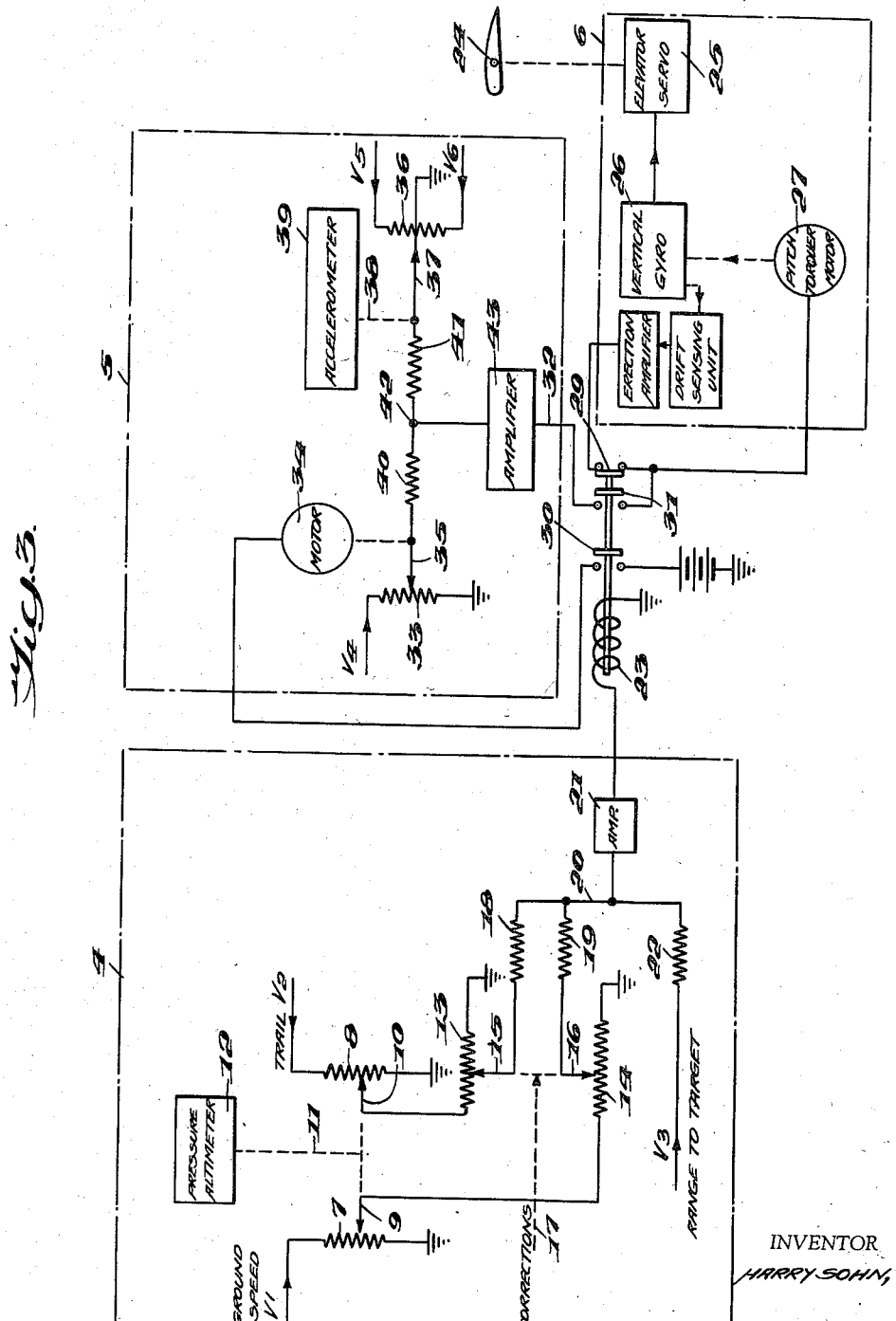

United States Patent Office 2,821,349
Patented Jan. 28, 1958

2,821,349

DIVE CONTROL SYSTEM FOR PILOTLESS AIRCRAFT

Harry Sohn, Essex, Md., assignor to The Glenn L. Martin Company, Middle River, Md., a corporation of Maryland Application November 4, 1952, Serial No. 318,589

7 Claims. (Cl. 244—14)

This invention relates to an improvement in guidance systems for pilotless aircraft, and more particularly to an arrangement for controlling the terminal portion of the flight of such an aircraft so that it will follow a predetermined dive path onto its target from its normal flight altitude.

In directing pilotless aircraft, particularly the type known as guided missiles, it is desirable to have the missile approach the target at a relatively high altitude and to cause it to dive steeply onto the target in order to minimize the possibility of detection and interception. Control during the portion of the flight prior to the terminal dive may be effected by use of a guidance system such as is disclosed in copending application of Dike, Strickroth and Jenkins Serial No. 209,316, entitled "Guidance System for Aircraft," which provides for lateral control to cause the missile to follow a hyperbolic path, along which the time difference in the reception of guidance signals from a pair of spaced transmitting stations is a constant.

Obviously some form of control must also be provided for the terminal dive of the missile to insure that it will strike its intended target. A number of systems have been heretofore proposed to accomplish this end but have proved impractical, excessively complicated, or otherwise unsatisfactory. However, it is evident that if, as is true in the aforementioned guidance system, the position of the missile with respect to the target can be determined at all times, and the missile can be caused to dive along a trajectory whose horizontal distance component is determinable, the missile can be released from its normal guidance system at a point at which the missile's distance from the target equals the horizontal distance component of the expected terminal dive trajectory, and it will descend accurately upon the target. Obviously the simplest expedient would be to release the missile from its guidance system at the selected point and allow it to fall freely. However, the varying lift produced by the wings of the missile during its descent would cause it to deviate substantially from the path followed in a free ballistic fall so that the horizontal distance traveled by the missile during the fall would not be predeterminable and it would not be possible to determine the point in the normal flight path at which the fall should be initiated. If, however, the missile can be caused to assume an angle of attack at all times during its descent such that its wings produce no lift, it will follow the same generally parabolic path as a projectile in a free ballistic fall and the horizontal distance component of the terminal dive may be easily determined in order to indicate the precise point in the flight path at which the missile must be released in order to strike the target.

It is the object of this invention, therefore, to provide a system for controlling the terminal dive of a guided missile so that it will descend accurately on its target.

It is a further object of this invention to provide a terminal dive system which will cause the missile to descend with its angle of attack such that the wings of the missile will produce no lift during the terminal dive.

It is a further object of this invention to provide a terminal dive system for a missile which will cause the missile to descend along a predeterminable trajectory. It is a still further object of this invention to provide a terminal dive system in which the missile is released from its normal guidance system and the terminal dive initiated at the moment when the distance of the missile from its target equals the horizontal distance to be traveled by the missile during its terminal dive.

These and further objects will become apparent from the following description and claims when taken in conjunction with the accompanying drawings.

In the drawings:

Fig. 1 is a diagram showing the trajectory followed by the missile during the latter portion of its flight and including its terminal dive.

Fig. 2 is a simplified block diagram of the zero-lift dive system.

Fig. 3 is a schematic showing of the components of the system.

The diagram of Fig. 1 shows the terminal portion of the flight path of a missile 1 directed against a target 2 and incorporating my novel dive control system. As hereinbefore stated, control of the missile during the portion of the flight prior to the initiation of the terminal dive may be effected by use of a suitable level flight guidance system. When the missile reaches the point 3 on its flight path at which the terminal dive should commence in order that the dive trajectory pass through the target, pitch, roll and yaw control of the missile is released from the level flight guidance system and is assumed by the terminal dive control system, herein described, which causes the missile to continuously assume an angle of attack at which no lift is produced by the wings 3', so that the missile falls to the target along the ballistic trajectory of a freely falling projectile. The point 3, where the dive commences, is commonly referred to as the "dump point."

The dive control system as shown in the simplified block diagram of Fig. 2 comprises a release point initiator 4, a zero lift programmer 5, and a pitch control unit 6, each of which will be more fully discussed hereinafter. In operation, the release point initiator receives from the level flight guidance system, such as that of the previously mentioned copending application, signals proportional to ground speed of the missile and its horizontal range from its target, and, from suitable altitude sensing means, information as to the pressure altitude of the missile. The initiator determines, from the altitude and ground speed information, the horizontal distance through which the missile will travel during its terminal dive and produces a voltage proportional to the distance so determined. This voltage is compared, in turn, with the voltage of the input signal representing the horizontal range of the missile from the target. When the two values are equal, the initiator produces a release signal which initiates operation of the zero lift programmer 5 and simultaneously releases the missile from its level flight pitch control system. The programmer, in turn, generates an elevator control signal which is utilized in the pitch control unit 6 to continuously adjust the trim of the missile so as to maintain an angle of attack throughout the dive such that the missile's wings produce no lift. Thus the missile is caused to follow a dive path substantially similar to the path followed by a projectile in a free ballistic fall.

The theoretical horizontal distance that would be traveled by a missile falling freely in a vacuum would be equal to the product of the missile's ground speed at the beginning of the fall times the time of fall. However, due to air resistance, the actual distance that would be traversed by such a freely falling missile is considerably less than the theoretical distance, the difference being commonly called "trail."

By mathematical analysis, beyond the scope of this specification but well known in the art, both the time of fall and the amount of trail for a zero lift trajectory to sea level through a standard atmosphere can be calculated for a missile of given configuration, flying at a given indicated air speed at various pressure altitudes. For a constant indicated airspeed both the trail and the time of fall can be expressed as functions of the pressure altitude at which the dive begins and curves of the time of fall and the trail plotted against the pressure altitude can be drawn. Advantage is taken of this fact in the design of the release point initiator used to determine the dump point. To this end the missile is constrained by a suitable transducer (not shown), responsive to indicated airspeed so that the missile flies throughout its normal flight at a constant predetermined indicated airspeed. Thus, under standard conditions, both the time of fall and the amount of trail can be readily determined from the pressure altitude as measured by a suitable pressure type altimeter on the missile.

Referring now to Fig. 3, the release point initiator 4 includes a pair of potentiometers 7 and 8 which will be termed the time-of-fall and trail potentiometers respectively. These potentiometers have their movable wipers 9 and 10 connected as indicated at 11 for actuation by a pressure altimeter 12 so that the wipers will be at the grounded ends of the potentiometers when the pressure altitude is zero and will move upwardly in response to an increase in pressure altitude, so that for any given pressure altitude the resistance between the wipers and ground will be proportional to the calculated time of fall and trail respectively for that pressure altitude. This is most readily attained by using non-linear potentiometers, the resistance curves of which correspond to the time-of-fall and trail curves as previously determined. A voltage $V_1$ proportional to the ground speed of the missile (which is obtainable, as above set forth, from the guidance system shown in the above-mentioned copending application) is applied to the upper end of potentiometer 7. The voltage at wiper 9 will therefore be proportional to the product of time-of-fall times the ground speed and will represent the horizontal distance that the missile would travel beyond the dump point if it fell without decrease in horizontal velocity for the time represented by the position of the time-of-fall wiper 9.

Applied to the top of trail potentiometer 8 is a constant voltage $V_2$ of opposite sign to $V_1$ and of a value proportional to that of the trail calculated for the pressure altitude which corresponds to the uppermost position of the wiper 10. Thus the voltage at wiper 10 will, for any pressure altitude, correspond to the value of trail for that altitude. The difference between the voltages at wipers 9 and 10 for any pressure altitude and ground speed will therefore be proportional to the actual horizontal distance that the missile would travel under standard conditions if released at that altitude and ground speed to fall along a zero-lift trajectory to sea level.

However, under practical conditions, the elevation of the target may be considerably above sea level, while atmospheric conditions over the target may deviate considerably from standard conditions. Either of these factors will affect the time of fall and trail and hence the actual distance that the missile will travel beyond the dump point. To compensate for such variation of target elevation and/or atmospheric conditions over the target, a pair of compensating potentiometers 13 and 14 are provided, having their wipers 15 and 16 manually adjusted, as indicated at 17, prior to the flight of the missile, to correct for known target elevation and forecast deviations of the atmosphere over the target area from standard conditions. The amount of correction required for various target elevations and atmospheric conditions can readily be calculated and the wipers 15 and 16 set so that the voltages thereon will represent the voltages at 9 and 10 corrected to compensate for such deviations.

Wipers 15 and 16 of the compensating potentiometers on which appear the corrected voltages are connected through a pair of relatively high resistances 18 and 19 to a bus 20 which is in turn connected to the control grid (not shown) of a suitable amplifier 21. A voltage $V_3$, of the same sign as $V_2$ and of a value representing the horizontal range to the target, is also applied through a resistor 22 to the bus 20. Voltage $V_3$ may be obtained from the guidance system as previously discussed. Resistors 18, 19 and 22 are of equal value and form a voltage combining network such that the voltage on bus 20 will always be proportional to the algebraic sum of these voltages. Since $V_2$ and $V_3$ are of opposite sign from $V_1$, the voltage on the bus 20 will correspond to the difference between the range to the target at any time (represented by $V_3$) and the actual horizontal distance (represented by the difference in voltage between wipers 16 and 15) that the missile will travel during its terminal dive. Amplifier 21 is so biased that when the voltage on bus 20 falls to zero it will energize dump relay 23 to cause the latter to initiate the dive maneuver as hereinafter described.

Pitch stabilization of the missile during normal flight is obtained in generally conventional fashion by means of a suitable movable control surface, such as an elevator 24, adapted to be actuated by a servo-unit 25 controlled by the usual vertical gyro 26. The same gyro 26 may also be used for roll stabilization, as is customary in the art, but, to avoid confusion only the pitch control channel is illustrated in the drawing. Gyro 26 is normally maintained vertical by a conventional erecting system which includes a pitch torque motor 27 and a pitch erection amplifier 28 controlled by a gyro drift sensing unit 28' which is responsive in known fashion to any drift of the gyro from vertical about its pitch axis to energize the torque motor so as to precess the gyro back to vertical position.

Dump relay 23, upon energization, opens its contact 29 to disconnect the torque motor 27 from the erection amplifier 28, closes its contact 30 to start the programmer 5 into operation and closes its contacts 31 to connect the torque mortor 27 to the output 32 of the programmer.

The programmer 5 includes a potentiometer 33 across which is impressed a suitable voltage $V_4$. A constant speed motor 34, operation of which is initiated by the closing of relay contacts 30, is utilized to drive the wiper 35 of potentiometer 33 downwardly, at a constant, predetermined rate, from its normal position adjacent the top of the potentiometer. A second potentiometer 36 has its midpoint grounded and has a pair of voltages $V_5$ and $V_6$ of equal amplitude applied to its opposite ends. Voltage $V_5$ is of the same sign or phase as $V_4$ while $V_6$ is of opposite sign or phase. The wiper 37 of potentiometer 36 is operatively connected as indicated at 38 to an accelerometer 39 mounted in the missile so that its axis of response is perpendicular to the velocity axis of the missile when in a zero-lift attitude. Wiper 37 is normally positioned at mid-range of potentiometer 36 and is moved upwardly or downwardly from normal by the accelerometer 39 whenever the latter is subject to an acceleration along its response axis. The arrangement is such that an acceleration in the positive lift direction will move the wiper 37 upwardly while a negative lift will move the wiper downwardly, the extent of movement in each case being proportional to the magnitude of the acceleration.

Wipers 35 and 37 are connected together through a combining network comprising a pair of resistors 40 and 41 connected together, and having their common junction 42 connected through a suitable amplifier 43 to the output 32. Resistors 40 and 41 are equal and preferably of relatively high value, and the voltage at the output will therefore be proportional to the algebraic sum of the voltages appearing at the wipers 35 and 37. The amplified output at 32 is applied through relay contacts 31 to the torque motor 27, causing the latter to precess the gyro 26 at a rate proportional to the output from the programmer and in such a direction as to apply a "down elevator" signal to the servo unit, thus nosing the aircraft downwardly into a diving attitude.

A zero-lift trajectory, such as is contemplated by this invention, closely approximates a parabolic curve and since the change in the rate of curvature of a parabola is a constant, it is possible to select a speed of operation for motor 34 such that, in conjunction with the normal voltage from accelerometer potentiometer 37, the gain of the amplifier 43, and the precession characteristics of the gyro 26, the voltage applied to the torque motor will decrease steadily to cause the gyro to precess at a correspondingly steadily changing rate so as to cause the missile to progressively assume an angle of attack closely approximating that necessary to maintain a zero-lift descent.

The accelerometer 39 is thus required merely to sense and correct for any slight departures of the missile from a true zero-lift attitude and can therefore be made much more sensitive than if it alone were relied upon to control the precession of the gyro. The arrangement is such that any slight deviation of the missile from the zero-lift attitude will produce a relatively large correction voltage at the motor 27 to instantly return the missile to its zero-lift attitude. For example, if at any point in the trajectory the accelerometer detects a positive lift (corresponding to too high an angle of attack) wiper 37 will be moved upwardly to increase the voltage applied to the torque motor, causing the latter to precess the gyro at a higher rate so as to cause a rapid decrease in the angle of attack. Conversely negative lift will result in a decrease in voltage applied to the torque motor, slowing down or reversing the rate of precession of the gyro so as to quickly increase the angle of attack.

The above-described system provides a relatively simple, effective, and accurate method for delivering a radio guided, pilotless aircraft or missile to its target from its level flight altitude. The system will accurately determine the point at which the terminal dive of the aircraft or missile should be initiated, and provides control for the missile during the dive to insure that it follows the desired trajectory to strike its target.

While the present system has been described in conjunction with a particular level flight control system, it is obviously suitable for use with any aircraft guidance system which provides the necessary range and ground speed information for utilization in the release point initiator, and although but one form of the invention has been described in detail it should be understood that the invention is not confined to the precise details of construction herein set forth, as it is apparent that many changes and modifications could be made without departing from the scope of the invention, and no limitation is intended by the phraseology of the foregoing description or the accompanying drawings.

Thus for ease of explanation, certain of the voltages have been described as being of opposite sign or polarity. By this it is meant to include not only negative and positive D. C. voltages but also pulsating or alternating current voltages having a 180° relative phase displacement, since it is well within the purview of those skilled in the art to provide the proper amplifiers, etc., for operation with whichever type of voltage is selected.

It is moreover believed clear that various other known voltage mixing networks could be substituted for those shown without affecting the principle of operation of the invention.

Similarly, while in the arrangement shown, the output from the dive programmer is fed into the pitch control system by causing the gyro to precess from its normal vertical condition in response to such output, it will be obvious to those skilled in the control art that the programmer output could be fed into the control system in many other ways, as by the use of conventional mixing amplifiers, for example. These, and many other changes could obviously be made without departing from the spirit and scope of the invention as defined by the appended claims.

I claim:

1. A control system for a winged aircraft comprising a gyroscope carried within said aircraft, torque producing means for precessing said gyroscope at a predetermined variable rate, means carried within said aircraft and responsive to accelerations of said aircraft due to lift produced by the wings of said aircraft for modifying the action of said torque producing means to change the rate of precession of said gyroscope, and aerodynamic means responsive to the angular position of said gyroscope with respect to the longitudinal axis of said aircraft for controlling the angle of attack of said aircraft.

2. A dive control system for a winged aircraft comprising aerodynamic means for controlling the angle of attack of said aircraft, gyroscope means pivotally mounted in said aircraft, means responsive to angular motion of the longitudinal axis of said aircraft with respect to said gyroscope means for controlling the position of said aerodynamic means, torque producing means for precessing said gyroscope means at a predetermined rate about its pivot axis, means responsive to accelerations of said aircraft due to lift forces produced by the wings of said aircraft for modifying the precession rate of said gyroscope in accordance with the magnitude and sense of said lift forces, whereby said aerodynamic means is continuously positioned so as to cause said aircraft to maintain a flight attitude such that no lift is produced by said wings.

3. A control system for a winged aircraft comprising aerodynamic means for controlling rotation of said aircraft about a pitch axis, electrical means for producing a voltage varying at a predetermined rate, an accelerometer carried by said aircraft and responsive to lift forces produced by the wings of said aircraft, a second electrical means controlled by said accelerometer to produce a second voltage varying in accordance with the magnitude and direction of said lift forces for modifying said first voltage to produce a third voltage proportional to the sum of said two first mentioned voltages, torque producing means responsive to said third voltage to produce a torque proportional thereto, a gyroscope carried by said aircraft and responsive to relative angular motion of said aircraft about its pitch axis with respect to said gyroscope to produce a signal proportional to the magnitude of said angular motion, and means responsive to the signal produced by said gyroscope to vary the setting of said aerodynamic control means, said torque means being adapted to precess said gyroscope about said pitch axis whereby said aircraft is caused to follow a selected dive trajectory.

4. An aircraft, aerodynamic means for controlling rotation of said aircraft about its pitch axis, gyro means carried by said aircraft and responsive to angular motion of said aircraft about its pitch axis with respect to said gyro means for producing a voltage proportional to the magnitude of such angular motion, electrical means for producing a voltage varying at a predetermined rate, acceleration sensitive means responsive to accelerations produced by lift forces acting on said aircraft for modifying said last mentioned voltage in accordance with the magnitude and direction of said lift forces, torque means responsive to said modified voltage to produce a torque proportional thereto, said gyro means being responsive to said torque means to be precessed at a rate depending on the magnitude and direction of said torque.

5. A pitch control system for a winged aircraft comprising an elevator for controlling rotation of said aircraft about its pitch axis, gyroscope means carried within said aircraft and normally responsive to rotation thereof about its pitch axis to apply a corrective deflection to said elevator, electrical means for producing a voltage varying at a predetermined rate, means responsive to accelerations of said aircraft due to lift produced by the wings thereof for modifying the voltage produced by said electrical means by an amount proportional to the magnitude and direction of said accelerations, means responsive to said modified voltage for producing a force proportional thereto, said gyroscope means being responsive to said force to be precessed at a rate proportional to the magnitude of said force, whereby said elevator is deflected in a manner to cause said aircraft to follow a predetermined dive trajectory.

6. A pitch control system for a winged aircraft comprising an elevator for controlling rotation of said aircraft about its pitch axis, a gyroscope carried by said aircraft and responsive to rotation thereof about said pitch axis to produce a signal proportional to the amount of said rotation, servo mechanism responsive to said signal to apply a deflection to said elevator proportional to the magnitude of said signal in a direction to restore said aircraft to its original position relative to said gyro, a torque motor for applying a precessing force to said gyroscope, electrical means for producing a voltage decreasing at a constant rate, an accelerometer responsive to any acceleration of said aircraft due to lift forces produced by the wings thereof to produce a second voltage proportional to the magnitude of said acceleration, electrical means for combining said voltages to produce a third voltage proportional to the sum thereof, said torque motor being responsive to said third voltage to precess said gyroscope at a rate proportional to said third voltage whereby said elevator is continuously positioned so as to cause said aircraft to continuously assume an angle of attack such that no lift is produced by the wings of said aircraft.

7. A control system for a missile having lift producing wings, pitch control means to vary the angle of attack of said missile for controlling the lift produced by said wings and gyro means pivotally carried by said missile for controlling said pitch control means to normally maintain said missile in a substantially horizontal flight attitude, and means including a torque motor operative when energized to precess said gyro means about its pitch axis for normally maintaining said gyro means in a predetermined attitude in space about said axis, a dive programmer including a source of voltage, a potentiometer across said source and having a wiper, a constant speed motor connected to said wiper for moving said wiper, upon energization of said motor, from an initial high potential position toward a low potential position, a lift-responsive accelerometer carried by said missile, means operated by said accelerometer for producing a correction voltage, the polarity and amplitude of which vary in accordance with the sense and magnitude of the lift sensed by said accelerometer, mixer means for combining said correction voltage with the voltage at said wiper, and means for simultaneously energizing said constant speed motor and connecting said torque motor for control by the output of said mixer means whereby said gyro means will be precessed by said torque motor about its pitch axis so as to cause said missile to dive along a substantially zero-lift trajectory.

References Cited in the file of this patent

UNITED STATES PATENTS

| | | |
|---|---|---|
| 2,339,011 | Gurney | Jan. 11, 1944 |
| 2,520,665 | Warren | Aug. 29, 1950 |
| 2,627,384 | Esval | Feb. 3, 1953 |
| 2,677,513 | Kliever | May 4, 1954 |
| 2,711,867 | Feeney | June 28, 1955 |